United States Patent [19]

Fox et al.

[11] Patent Number: 4,472,295

[45] Date of Patent: Sep. 18, 1984

[54] CONDUCTIVE MOLDING COMPOSITION AND DISCS THEREFROM

[75] Inventors: Leonard P. Fox, Cherry Hill; Louis A. DiMarco, Hamilton Square, both of N.J.

[73] Assignee: RCA Corporation, New York, N.Y.

[21] Appl. No.: 533,043

[22] Filed: Sep. 16, 1983

Related U.S. Application Data

[63] Continuation of Ser. No. 322,299, Nov. 17, 1981, abandoned.

[51] Int. Cl.$^3$ .............................................. H01B 1/06
[52] U.S. Cl. .................................... 252/511; 524/495; 524/496; 524/567; 523/174; 358/342; 358/344; 264/105
[58] Field of Search ................. 252/511; 524/495, 496, 524/567; 523/174; 358/342, 344; 369/126, 276; 264/104, 105; 423/447.8, 445

[56] References Cited

U.S. PATENT DOCUMENTS

| | | | |
|---|---|---|---|
| 2,997,451 | 8/1961 | Miller | 260/41 |
| 3,563,916 | 2/1971 | Takashina et al. | 252/511 |
| 3,842,194 | 10/1974 | Clemens | 178/6.6 A |
| 3,842,217 | 10/1974 | Clemens | 179/100.4 C |
| 3,909,517 | 9/1975 | Clemens | 178/6.6 A |
| 4,105,464 | 8/1978 | Osswald et al. | 106/307 |
| 4,123,400 | 10/1978 | Gay | 260/23 XA |
| 4,228,050 | 10/1980 | Martin et al. | 523/174 |
| 4,246,251 | 1/1981 | Braddock | 423/450 |
| 4,396,660 | 8/1983 | Hata et al. | 252/511 |

OTHER PUBLICATIONS

L. B. Sushkova et al., *Plasticheske Massy*, 1977, No. 9, p. 731.
*Chemical Abstracts*, vol. 87, No. 24, Abstract No. (185,615S) entitled "Influence of Pigments on Temperature Stability of Plasticized PVC During Roll Milling".
J. H. Smuckler et al., "Performance of Conductive Carbon Blacks in a Typical Plastic System," Report No. S-24, (1973).
F. Spinelli, "Fundamentals of Carbon Black Technology," (1970).
"Carbon Blacks for Conductive Plastics," Report No. S-8.

*Primary Examiner*—Josephine Barr
*Attorney, Agent, or Firm*—Birgit E. Morris; R. Hain Swope

[57] ABSTRACT

A high density capacitive information disc recording medium fabricated from a conductive plastic molding composition including a moldable plastic and conductive carbon black particles having a volatiles content at 950° C. of less than about 1 percent.

2 Claims, No Drawings

CONDUCTIVE MOLDING COMPOSITION AND DISCS THEREFROM

This is a continuation of application Ser. No. 322,299, filed Nov. 17, 1981 now abandoned.

This invention relates to an improved molding composition. More particularly, the invention relates to an improved carbon-filled conductive molding composition and a capacitive information disc produced therefrom.

BACKGROUND OF THE INVENTION

Clemens, in U.S. Pat. Nos. 3,842,194, 3,842,217 and 3,909,517, has described a capacitive information disc having video/audio information in the form of geometric variations in a spiral groove in the disc surface. Capacitive variations between the disc surface and a conductive electrode on a playback stylus are sensed to recover the recorded information.

Capacitive information discs may be made from conductive plastic molding compositions which include a vinyl chloride homopolymer or copolymer and sufficient amounts of conductive particles such as carbon black particles so that the disc can provide capacitive readout. The molding may be, for example, by compression, injection or embossing methods.

Capacitive information discs which do not require a grooved surface have also been developed. With this type of disc the stylus is maintained in synchronization with an information track by means of encoded electrical signals on either side of the information track rather than physically by means of the groove.

Because of the high loading of carbon black present with the vinyl chloride-based resin, the melt viscosity of the conductive plastic molding composition is high. As a result, during composition processing, such as extrusion or mixing, high shear stress occurs which causes shear heating that may lead to premature decomposition of the vinyl chloride resin as well as reactions involving the lubricants, processing aids, stabilizers and the like which are present. It would therefore be advantageous to develop conductive plastic molding composition and capacitive information disc records derived therefrom which have increased stability during processing and molding so that decomposition and other reactions which can lead to defects detectable on playback are reduced.

SUMMARY OF THE INVENTION

We have found that conductive molding compositions and capacitance information records molded therefrom comprised of moldable plastic resins containing sufficient conductive carbon particles for capacitive readout wherein the carbon particles have a low volatiles content at 950° C. have improved thermal stability.

DETAILED DESCRIPTION OF THE INVENTION

The carbon black particles used in the preparation of capacitive information disc records are generally highly electrically conductive, finely divided carbon blacks preferably having a low bulk density. Generally the bulk density is about 140–160 grams per liter and the average particle size is about 300 angstroms. These carbon blacks preferably also have a high surface area with a high proportion of voids within the particles, as measured, for example, by nitrogen surface area (ASTM test D3037-78) or iodine surface area (ASTM test D1510-79). A nitrogen surface area of at least about 800–1000 $m^2/g$ is preferred. The structure of the carbon black can also be determined by dibutyl phthalate (DBP) absorption. Generally a DBP value about 200–350 is preferred. It is believed that these characteristics enable current to flow between the conductive particles in a non-conductive polymeric matrix in a highly efficient manner. The resistivity of capacitance electronic discs must be less than about 500 ohm-cm, preferably about 10 or less ohm-cm, at about 900 megahertz (MHz) in order for video signals encoded in a disc surface to be recovered on playback. Generally, for highly conductive carbon black particles, a loading of between about 10 and 20 percent by weight of the molding composition is employed.

It has long been known that carbon black particles often contain oxygen functionalities such as acids and phenols on the surface. Typically, these carbon blacks are somewhat acidic, having a pH in the range of 2–5 as measured by ASTM test 1512-79. On heating in either an inert or reducing atmosphere at temperatures of above about 900° many of these surface oxygen groups are driven off and are therefore often referred to as 950° C. volatiles. After heating at 950° the oxygen-containing functionalities which contribute to the low pH have been removed and the resulting pH of the carbon black surface is alkaline—that is, about 7–10 pH units. For furnace carbon blacks, which are often employed in conductive molding compositions, the loss of volatiles contribute to only a small and unimportant decrease in the resistivity of the carbon black particles both alone and in polymeric compositions. For example, the difference in resistivity between a carbon black that has a 950° C. volatiles content of 0.2% and another which is 2–3%, is only about 1–2 ohm-cm.

However, a surprising result we have found is that the use of carbon black particles having a low volatiles content results in conductive plastic molding compositions having significantly increased thermal stability. This thermal stability enhancement allows a capacitive information disc to be molded which has fewer decomposition products present. Generally, the volatiles content of carbon black particles measured at 950° C. using ASTM test D1620-69 should be less than about 1 percent by weight, preferably less than about 0.5 in order to have carbon black containing vinyl chloride resin compositions having increased thermal stability.

The present poly(vinyl chloride)-carbon black conductive molding compositions can be mixed with various additional ingredients including stabilizers, lubricants, processing aids, modifiers and the like. For a discussion of the ingredients employed in capacitive information disc conductive molding compositions see Martin et al., U.S. Pat. No. 4,228,050, incorporated herein by reference.

The carbon black particles having a low volatiles content may be added when the plastic molding composition is either a dry mixture or a molten composition. For example, a Banbury mixer and a Brabender apparatus or a twin screw extruder can be employed to mix and blend the plastic resin, the additives and the carbon black particles. The resulting composition can be sheeted on a two-roll mill, pelletized and stored for molding into capacitive information discs at some future time.

The present invention will be further illustrated by means of the following Examples. However, it is to be understood that these Examples are not intended to limit the scope of the present invention.

EXAMPLE 1

A composition shown in Table I was blended

TABLE I

| Ingredient | Description | Percent by Weight |
| --- | --- | --- |
| Air Products 480 Resin | a vinyl chloride propylene copolymer which has a $T_g$ of 76° C. | 69.4 |
| Carbon black I | a carbon black having a particle size diameter of 150–350 angstroms, a nitrogen surface area of 800–1,000 m²/g, a DBP value of 200–350 cc/100 g, weight percent high temperature (950° C.) volatiles as measured by ASTM test D1620-69 of 0.2 and an apparent bulk density of 150 g/l | 20.0 |
| Thermolite T-35 (M & T Chemical Co.) | dibutyltin bis-octyl-mercaptopropionate stabilizer | 1.4 |
| Mark G232B (Argus Chemical Co.) | barium lead stabilizer | 0.94 |
| Unichlor 70AX (Neville Chemical wax Co.) | a chlorinated paraffin | 1.9 |
| Benzoflex S404 (Velsicol Chemical Corp.) | glyceryl tribenzoate | 0.94 |
| Acryloid K-175 (Rohm and Haas Co.) | an acrylic processing aid | 1.9 |
| Loxiol G-30 (Henkel International GmbH) | a mixture of a mono fatty acid ester of varying molecular weight alcohols and acids | 0.47 |
| Loxiol G-70 (Henkel International GmbH) | a polyfunctional complex ester of saturated fatty acids | 0.23 |
| Wax E (Hoechst Co.) | an esterified montan wax | 0.38 |
| Mark 275 (Argus Chemical Co.) | dibutyl tin maleate stabilizer | 0.94 |
| Paraplex G-62 (Rohm and Haas Co.) | epoxidized soybean oil | 0.94 |
| Olio de Vaselina (Carlo Erbe, Inc., Milano, Italy) | low molecular weight paraffin | 0.28 |
| Calcium stearate | polymer grade | 0.28 |
| | | 100.0 |

The melt viscosity at various shear rates where shear heating occurs was measured using a Instrom capillary rheometer apparatus. This composition was stable through a shear rate of 1,500 sec$^{-1}$.

CONTROL 1

The same formulation and test procedures as in Example 1 were employed except that the carbon black 950° C. volatiles content was 2 percent as measured by ASTM test D1620-69. This use of this carbon black resulted in a conductive plastic molding composition which was found to decompose at a shear rate of 100 sec$^{-1}$. This composition was therefore considerably less thermally stable than that of Example 1.

EXAMPLE 2

The following composition was employed in this Example:

TABLE II

| Ingregient | Description | Percent by Weight |
| --- | --- | --- |
| B. F. Goodrich Geon 110 × 346 | a homopolymer of vinyl chloride having a weight average molecular weight of 46,200, a number average molecular weight of 23,300 and a $T_g$ of 83° C. | 75.0 |
| Carbon black II | a carbon black with a volatiles content at 950° C. of 0.36 percent having the same general properties of carbon black I | 15.0 |
| Thermolite T-35 | | 1.5 |
| Mark 275 | | 1.0 |
| Acryloid K-147 (Rohm and Haas Co.) | a solid acrylic modifier | 2.0 |
| Acryloid K-175 | | 0.75 |
| Loxiol G-30 | | 0.50 |
| Loxiol G-70 | | 0.25 |
| Calcium stearate | | 1.0 |
| Diundecyl phthalate | | 3.0 |
| | | 100.0 |

The thermal stability of this composition was measured in a Brabender Torque Rheometer. Stability time is the time required at 200° C. to observe a rise in the equilibrium torque, which is considered to be the onset of thermal degradation. The stability time for this composition was 22.5 minutes at a rotor speed of 120 revolutions per minute (rpm).

CONTROL 2

The same formulation and test procedures as in Example 2 were employed except that the carbon black 950° C. volatiles content was 2.4 percent by weight using ASTM test D1620-69. Using the same thermal stability test as in Example II, the conductive plastic molding composition had a stability time of 15 minutes. Thus, the carbon black with the lower volatiles content although having the same physical and electrical properties as the higher volatiles content carbon black, had a 50 percent increase in thermal stability time.

Capacitive information discs compression molded from the compositions employed in Examples I and II had satisfactory performance properties for a consumer product.

We claim:

1. In a method of preparing a high density recording medium adapted for use with a playback stylus to effect recovery of signals occupying a band width of at least several megahertz when relative motion at a desired rate is established between the recording medium and the stylus, said medium having an information track constituted by a surface relief pattern in said track wherein the signals are recovered upon establishment of the relative motion at the desired rate, said method comprising: blending a composition comprising a resin consisting of a homopolymer or copolymer of vinyl chloride, stabilizers, lubricants, plasticizers and processing aids for such resins and a sufficient quantity of conductive carbon black particles so that said composition has a bulk resistivity below 500 ohm-cm at 900 megahertz; and compression molding high density recording medium therefrom, the improvement comprising the additional step of heating the conductive carbon black particles to a temperature above about 900° C. in an inert or reducing atmosphere so that the volatiles content of said particles at 950° C. is less than about 0.5 percent by weight, said heating step preceeding blending of said particles with the remaining ingredients.

2. An improved method in accordance with claim 1, wherein said carbon black particles are heated to a temperature of about 950° C.

* * * * *